US011916685B2

(12) United States Patent
Kitamura et al.

(10) Patent No.: US 11,916,685 B2
(45) Date of Patent: Feb. 27, 2024

(54) TRANSMISSION APPARATUS AND TRANSMISSION METHOD

(71) Applicant: Nippon Telegraph and Telephone Corporation, Tokyo (JP)

(72) Inventors: Kei Kitamura, Musashino (JP); Fumikazu Inuzuka, Musashino (JP); Akira Hirano, Musashino (JP); Masahito Tomizawa, Musashino (JP); Takuya Ohara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 379 days.

(21) Appl. No.: 17/293,743

(22) PCT Filed: Nov. 18, 2019

(86) PCT No.: PCT/JP2019/045056
§ 371 (c)(1),
(2) Date: May 13, 2021

(87) PCT Pub. No.: WO2020/110798
PCT Pub. Date: Jun. 4, 2020

(65) Prior Publication Data
US 2022/0006577 A1 Jan. 6, 2022

(30) Foreign Application Priority Data

Nov. 29, 2018 (JP) ................................ 2018-223791

(51) Int. Cl.
*H04L 29/08* (2006.01)
*H04L 1/22* (2006.01)
(Continued)

(52) U.S. Cl.
CPC .............. *H04L 1/22* (2013.01); *H04L 1/0041* (2013.01); *H04L 1/0045* (2013.01); *H04L 1/1607* (2013.01)

(58) Field of Classification Search
CPC ..... H04L 49/3063; H04L 49/25; H04L 47/50; H04L 49/1538; H04L 47/6225;
(Continued)

(56) References Cited

U.S. PATENT DOCUMENTS 6,886,107 B2 * 4/2005 Walsh ................. G06F 11/2038
714/4.12
8,873,380 B2 * 10/2014 Tochio .............. H04L 12/40189
370/228
(Continued)

FOREIGN PATENT DOCUMENTS

JP      H09-135228    5/1997
JP      H11-68716     3/1999
JP      2015-231091   12/2015

Primary Examiner — Jung Liu
(74) Attorney, Agent, or Firm — Fish & Richardson P.C.

(57) ABSTRACT

A transmission apparatus includes redundant first communication devices configured to communicate with a communication apparatus provided in a first network, and redundant second communication devices configured to communicate with a communication apparatus provided in a second network. The second communication devices include respective first ends that are ends of redundant communication paths of the first communication devices, and the first communication devices include respective second ends that are ends of redundant communication paths of the second communication devices.

8 Claims, 8 Drawing Sheets

(51) Int. Cl.
*H04L 1/00* (2006.01)
*H04L 1/1607* (2023.01)

(58) Field of Classification Search
CPC ....... H04L 45/74; H04L 49/30; H04L 49/901; H04L 49/153; H04L 49/90; H04L 49/352; H04L 1/0045; H04L 1/22; H04L 1/1607; H04L 1/0041
See application file for complete search history.

(56) References Cited

U.S. PATENT DOCUMENTS

| | | | |
|---|---|---|---|
| 2004/0258409 A1* | 12/2004 | Sadananda | H04L 45/02 398/50 |
| 2014/0133488 A1* | 5/2014 | Patel | H04L 49/3063 370/392 |
| 2016/0182146 A1* | 6/2016 | Schmidtke | H04Q 11/0062 398/2 |
| 2019/0187690 A1* | 6/2019 | Cella | G05B 23/0221 |

\* cited by examiner

TRANSMISSION APPARATUS AND TRANSMISSION METHOD

CROSS-REFERENCE TO RELATED APPLICATIONS

This application is a National Stage application under 35 U.S.C. § 371 of International Application No. PCT/JP2019/045056, having an International Filing Date of Nov. 18, 2019, which claims priority to Japanese Application Serial No. 2018-223791, filed on Nov. 29, 2018. The disclosure of the prior application is considered part of the disclosure of this application, and is incorporated in its entirety into this application.

TECHNICAL FIELD

The present disclosure relates to a transmission apparatus and a transmission method.

BACKGROUND ART

A transmission apparatus needs to be an apparatus in which redundancy of client-side channels (client redundancy) such as LAG redundancy or SDH redundancy and redundancy of line-side channels in which switching without any momentary interruption is performed (line redundancy) are used. The transmission apparatus of the related art performs termination processing of the client redundancy and performs the line redundancy after a client signal is mapped to an optical channel data unit (ODU). However, there is no redundancy between a client redundancy section and a line redundancy section in the transmission apparatus as illustrated in FIG. 8. Thus, the transmission apparatus has a configuration of two channels-single path-two channels.

CITATION LIST

Patent Literature

Patent Literature 1: JP H09-135228 A

SUMMARY OF THE INVENTION

Technical Problem

However, when the transmission apparatus includes a connection portion between an interface card and a main board in the single path section, there is a problem in that reliability at the connection portion is reduced.

In view of the above circumstances, an object of the present disclosure is to provide a technology capable of improving reliability of a transmission apparatus.

Means for Solving the Problem

An aspect of the present disclosure is a transmission apparatus including redundant first communication devices configured to communicate with a communication apparatus provided in a first network, and redundant second communication devices configured to communicate with a communication apparatus provided in a second network, wherein the second communication devices include respective first ends that are ends of redundant communication paths of the first communication devices, and the first communication devices include respective second ends that are ends of redundant communication paths of the second communication devices.

Another aspect of the present disclosure is the transmission apparatus, wherein the first ends are configured to transmit received signals received by the second communication devices to the first communication devices, and each of the second ends is configured to select any one of the received signals transmitted from the second communication devices.

Still another aspect of the present disclosure is the transmission apparatus further including a redundancy controller configured to acquire redundancy information indicating a redundant state of the second communication devices from the second communication devices, and control one of the received signals selected by each of the second ends based on the redundancy information.

Still another aspect of the present disclosure is the transmission apparatus, wherein the second ends are configured to transmit received signals received by the first communication devices to the second communication devices, and each of the first ends is configured to select any one of the received signals transmitted from the first communication devices.

Still another aspect of the present disclosure is the transmission apparatus, wherein each of the first ends is configured to select any one of the received signals based on abnormality information indicating an abnormality of the network or a control signal for controlling which of the received signals is selected, the control signal being input by a user.

Still another aspect of the present disclosure is the transmission apparatus, wherein one or more of the first communication devices or the second communication devices are interface cards.

Still another aspect of the present disclosure is a transmission method including by a transmission apparatus, duplicating signals received by redundant second communication devices at first ends that are ends of communication paths of redundant first communication devices, and transmitting the duplicated signals to the first communication devices, by the transmission apparatus, selecting any one of the signals transmitted from the second communication devices at a second end that is an end of a redundant communication path of each of the second communication devices, and by the transmission apparatus, transmitting, the selected signals to a first network.

Effects of the Invention

According to the present disclosure, it is possible to further increase the reliability of the transmission apparatus.

DESCRIPTION OF EMBODIMENTS

First Embodiment

Figure 1:
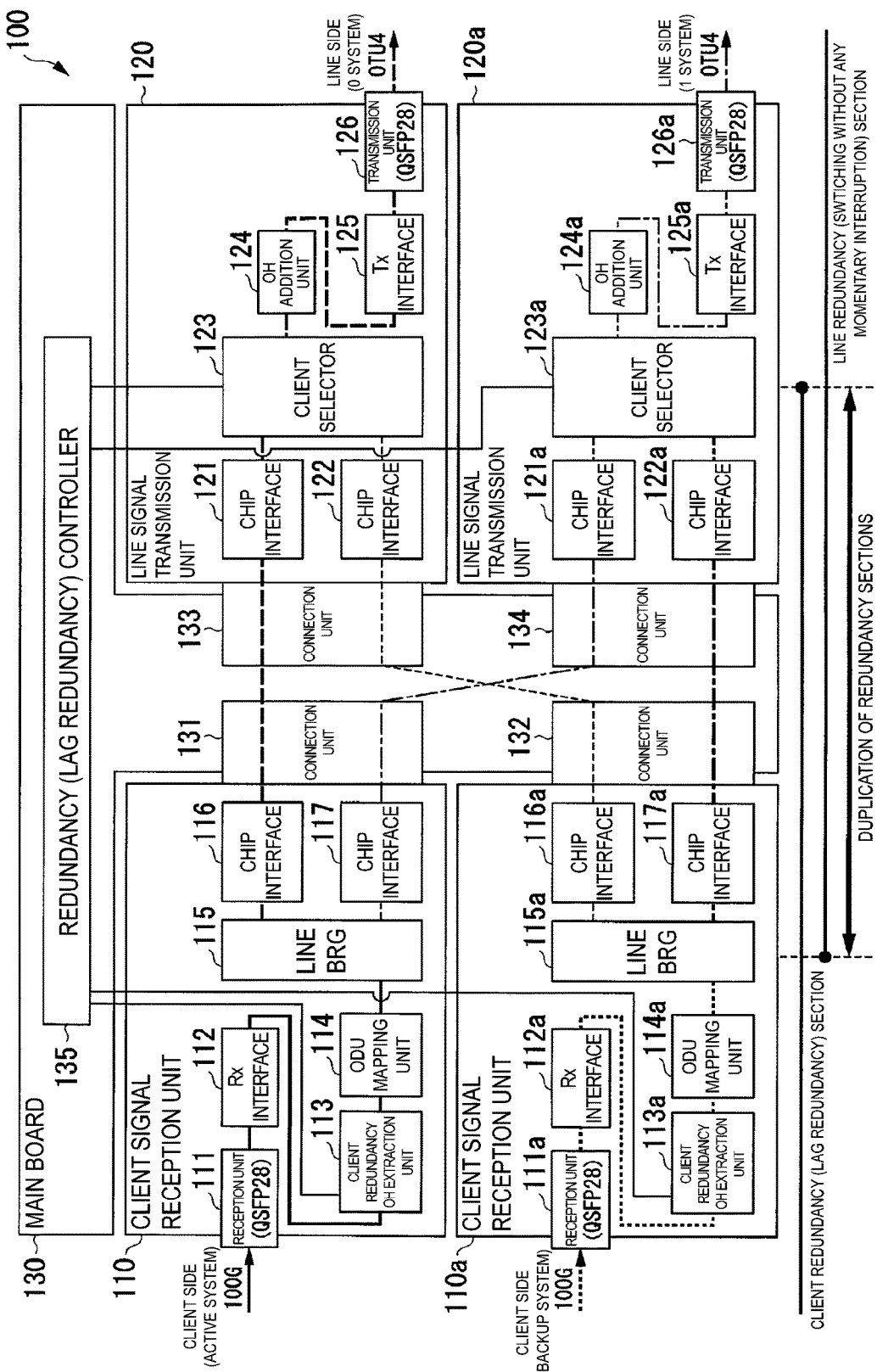
FIG. 1 is a functional block diagram of a transmission apparatus 100 for performing communication from a client side to a line side according to a first embodiment.

FIG. 1 is a functional block diagram of a transmission apparatus 100 that performs communication from a client side to a line side of a first embodiment. The transmission apparatus 100 includes a central processing unit (CPU), a memory, an auxiliary storage device, and the like connected to each other through a bus. The transmission apparatus 100 represents a configuration in which signals received from a client-side channel are transmitted to a line-side channel. The transmission apparatus 100 includes a client signal reception unit 110, a client signal reception unit 110*a*, a line signal transmission unit 120, a line signal transmission unit 120*a*, and a main board 130.

The client signal reception unit 110 is connected to a communication channel of an active system on the client side.

The client signal reception unit 110 is an interface card. The client signal reception unit 110 includes a reception unit 111, an Rx interface 112, a client redundancy overhead (OH) extraction unit 113, an ODU mapping unit 114, a line BRG 115, a chip interface 116, and a chip interface 117. The communication speed of the communication channel of the active system on the client side may be, for example, 100G, but is not limited to 100G. The client signal reception unit 110 is an aspect of a second communication device.

The reception unit 111 receives a received signal. The reception unit 111 photoelectrically converts the received signal.

The reception unit 111 transmits the photoelectrically converted received signal to the Rx interface 112. The received signals are 100 Gigabit Ethernet (GE) signals that are made redundant by an L2 switch or the like. The reception unit 111 is, for example, an interface such as QSFP28, but is not limited to such an interface. Any interface according to a speed or a type of the communication channel may be used for the reception unit 111.

The Rx interface 112 restores the photoelectrically converted received signal to a format of 100GE. The Rx interface 112 transmits the restored received signal to the client redundancy OH extraction unit 113.

The client redundancy OH extraction unit 113 extracts a link aggregation control protocol data unit (LACPDU) from the received signal. The client redundancy OH extraction unit 113 transmits the extracted LACPDU to a redundancy controller 135. The client redundancy OH extraction unit 113 transmits the received signal from which the LACPDU is extracted to the ODU mapping unit 114. The LACPDU is one aspect of redundancy information. The redundancy information represents a redundancy state of a plurality of client signal reception units. The redundancy state is, for example, information representing which of the client signal reception units is redundant.

The ODU mapping unit 114 maps the received signal to ODU4. The ODU mapping unit 114 adds an ODU overhead to the ODU4 to which the received signal is mapped. The ODU mapping unit 114 transmits the ODU4 to which the ODU overhead is added to the line BRG 115.

The line BRG 115 is a start end of a line redundancy section. The line redundancy section is a section representing a redundancy configuration of the line signal transmission unit 120 and the line signal transmission unit 120*a*. The line BRG 115 transmits the received ODU4 to a 0-system channel on the line side and to a 1-system channel on the line side for switching without any momentary interruption. Specifically, the line BRG 115 duplicates the ODU4 to ODU4-1 and ODU4-2. The line BRG 115 transmits the duplicated ODU4-1 to the chip interface 116. The line BRG 115 transmits the duplicated ODU4-2 to the chip interface 117. The line BRG 115 is one aspect of a first end.

The chip interface 116 converts the received ODU4-1 into a format transferable between chips. The chip interface 116 transmits the converted ODU4-1 to a connection unit 131. The chip interface 117 converts the received ODU4-2 into a format transferable between chips. The chip interface 117 transmits the converted ODU4-2 to the connection unit 131.

The client signal reception unit 110*a* is connected to a communication channel of a backup system on the client side. The client signal reception unit 110*a* is an interface card. The client signal reception unit 110*a* includes a reception unit 111*a*, an Rx interface 112*a*, a client redundancy OH extraction unit 113*a*, an ODU mapping unit 114*a*, a line BRG 115*a*, a chip interface 116*a*, and a chip interface 117*a*. The communication speed of a communication channel of the backup system on the client side may be, for example, 100G, but is not limited to 100G. The client signal reception unit 110*a* is an aspect of the second communication device. The communication channel of the backup system on the client side is redundant with the communication channel of the active system by a protocol such as LACP. The reception unit 111*a*, the Rx interface 112*a*, the client redundancy OH extraction unit 113*a*, and the ODU mapping unit 114*a* perform operations similar to the reception unit 111, the Rx interface 112, the client redundancy OH extraction unit 113, and the ODU mapping unit 114, and thus, the description thereof will be omitted.

The line BRG 115*a* is a start end of the line redundancy section. The line redundancy section is a section representing a redundancy configuration of the line signal transmission unit 120 and the line signal transmission unit 120*a*. The line BRG 115*a* transmits a received ODU4 to the 0-system channel on the line side and the 1-system channel on the line side for switching without any momentary interruption. Specifically, the line BRG 115*a* duplicates the ODU4 to ODU4-3 and ODU4-4. The line BRG 115*a* transmits the duplicated ODU4-3 to the chip interface 116*a*. The line BRG 115*a* transmits the duplicated ODU4-4 to the chip interface 117*a*. The line BRG 115*a* is one aspect of the first end.

The chip interface 116*a* converts the received ODU4-3 into a format transferable between chips. The chip interface 116*a* transmits the converted ODU4-3 to a connection unit 132. The chip interface 117*a* converts the received ODU4-4 into a format transferable between chips. The chip interface 117*a* transmits the converted ODU4-4 to the connection unit 132.

The line signal transmission unit 120 is connected to the 0-system communication channel on the line side. The line signal transmission unit 120 is an interface card. The line signal transmission unit 120 includes a chip interface 121, a chip interface 122, a client selector 123, an OH addition unit 124, a Tx interface 125, and a transmission unit 126. The line signal transmission unit 120 is an aspect of a first communication device. The first communication device communicates with a communication apparatus provided in a first network.

The chip interface 121 receives the ODU4-1 transmitted from the chip interface 116. The chip interface 121 restores the ODU4-1 converted to the format transferable between chips to a format before the conversion. The chip interface 121 transmits the restored ODU4-1 to the client selector 123. The chip interface 122 receives the ODU4-3 transmitted from the chip interface 116a. The chip interface 122 restores the ODU4-3 converted to the format transferable between chips to a format before the conversion. The chip interface 122 transmits the restored ODU4-3 to the client selector 123.

The client selector 123 is a terminal end of a client redundancy section. The client redundancy section is a section representing a redundancy configuration of the client signal reception unit 110 and the client signal reception unit 110a. The client selector 123 selects any one of the ODU4-1 and the ODU4-3 based on control determined by the redundancy controller 135. Hereinafter, it is assumed that the client selector 123 selects the ODU4-1. The client selector 123 transmits the selected ODU4-1 to the OH addition unit 124. The client selector 123 is an aspect of a second end.

The OH addition unit 124 inserts a OTU4 overhead into the selected ODU4-1. The OH addition unit 124 transmits the OTU4-1 to which the OTU4 overhead is added to the Tx interface 125.

The Tx interface 125 performs forward error correction (FEC) coding on the OTU4-1. The Tx interface 125 converts the FEC coded OTU4-1 into an interface of optical channel transport lane (OTL) 4.4. The OTL4.4 is the OTU4 divided into four physical lanes. The Tx interface 125 transmits the converted OTU4-1 to the transmission unit 126.

The transmission unit 126 photoelectrically converts the input signal (OTU4-1). The transmission unit 126 transmits the converted OTU4-1 to the outside of the transmission apparatus 100. The transmission unit 126 is, for example, an interface such as QSFP28, but is not limited to such an interface. An interface according to the speed of the communication channel may be used for the transmission unit 126.

The line signal transmission unit 120a is connected to the 1-system communication channel on the line side. The line signal transmission unit 120a is an interface card. The line signal transmission unit 120a includes a chip interface 121a, a chip interface 122a, a client selector 123a, an OH addition unit 124a, a Tx interface 125a, and a transmission unit 126a. The line signal transmission unit 120a is an aspect of the first communication device. The 0-system communication channel on the line side and the 1-system communication channel on the line side are redundant by means of switching without any momentary interruption. The OH addition unit 124a, the Tx interface 125a, and the transmission unit 126a perform operations similar to the OH addition unit 124, the Tx interface 125, and the transmission unit 126, and thus, the description thereof will be omitted.

The chip interface 121a receives the ODU4-2 transmitted from the chip interface 117. The chip interface 121a restores the ODU4-2 converted to the format transferable between chips to a format before the conversion. The chip interface 121a transmits the restored ODU4-2 to the client selector 123a. The chip interface 122a receives the ODU4-4 transmitted from the chip interface 117a. The chip interface 122a restores the ODU4-4 converted to the format transferable between chips to a format before the conversion. The chip interface 122a transmits the restored ODU4-4 to the client selector 123a.

The client selector 123a is a terminal end of the client redundancy section. The client selector 123a selects any one of the ODU4-2 and the ODU4-4 based on control determined by the redundancy controller 135. Hereinafter, it is assumed that the client selector 123a selects the ODU4-2. The client selector 123a transmits the selected ODU4-2 to the OH addition unit 124a. The client selector 123a is an aspect of the second end.

The main board 130 includes the connection unit 131, the connection unit 132, a connection unit 133, a connection unit 134, and the redundancy controller 135. The connection unit 131 is a network interface configured to allow an interface card to be attached and detached. The connection unit 131 communicatively connects the interface card connected to the connection unit 131 and an interface card connected to the connection unit 133 or the connection unit 134. The connection unit 131 connects the client signal reception unit 110.

The connection unit 132 is a network interface configured to allow an interface card to be attached and detached. The connection unit 132 communicatively connects the interface card connected to the connection unit 132 and the interface card connected to the connection unit 133 or the connection unit 134.

The connection unit 132 connects the client signal reception unit 110a.

The connection unit 133 is a network interface configured to allow an interface card to be attached and detached. The connection unit 133 communicatively connects the interface card connected to the connection unit 133 and the interface card connected to the connection unit 131 or the connection unit 132.

The connection unit 133 connects the line signal transmission unit 120.

The connection unit 134 is a network interface configured to allow an interface card to be attached and detached. The connection unit 134 communicatively connects the interface card connected to the connection unit 134 and the interface card connected to the connection unit 131 or the connection unit 132.

The connection unit 134 connects the line signal transmission unit 120a.

The redundancy controller 135 determines the ODU4 selected by the client selector 123 based on the LACPDU. In the first embodiment, the redundancy controller 135 determines which of the ODU4-1 or the ODU4-3 is selected by the client selector 123 based on the LACPDU transmitted by the client redundancy OH extraction unit 113. The redundancy controller 135 transmits the determination result to the client selector 123. In the first embodiment, the redundancy controller 135 determines which of the ODU4-2 or the ODU4-4 is selected by the client selector 123a based on the LACPDU transmitted by the client redundancy OH extraction unit 113a. The redundancy controller 135 transmits the determination result to the client selector 123a.

In the transmission apparatus 100 of FIG. 1, a section from the reception unit 111 of the client signal reception unit 110 and the reception unit 111a of the client signal reception unit 110a to the client selector 123 and the client selector 123a is a client redundancy (LAG redundancy) section. A section from the line BRG 115 and the line BRG 115a to the transmission unit 126 of the line signal transmission unit 120 and the transmission unit 126a of the line signal transmission unit 120a is a line redundancy (switching without any momentary interruption) section. Thus, in the transmission apparatus 100, a section from the line BRG 115 and the line BRG 115a to the client selector 123 and the client selector 123a is a section in which the client redundancy section and the line redundancy section overlap each other. Thus, the above section ensures a 4-path redundancy.

Figure 2:
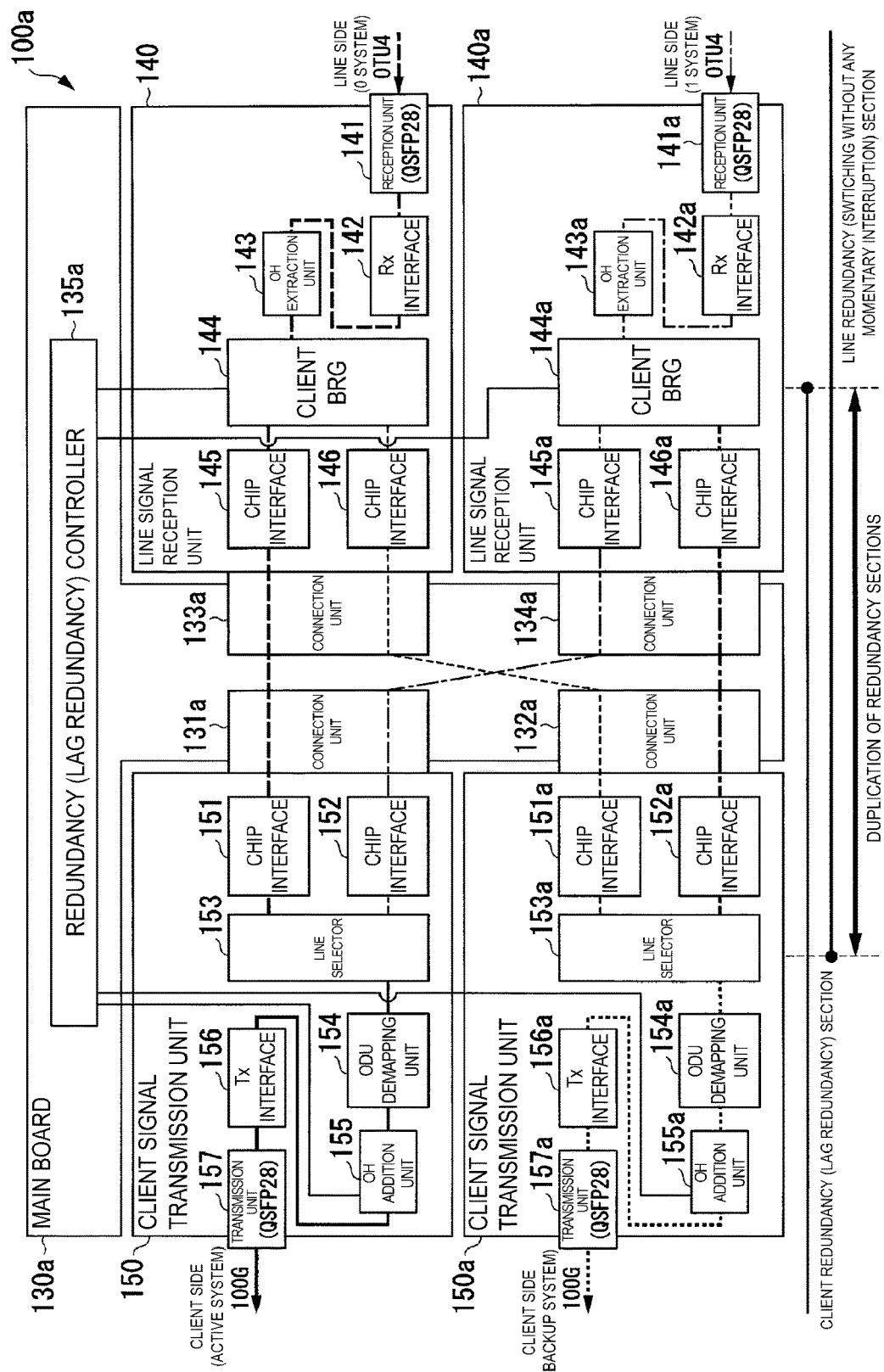
FIG. 2 is a functional block diagram of a transmission apparatus 100a for performing communication from the line side to the client side according to the first embodiment.

FIG. 2 is a functional block diagram of a transmission apparatus 100a for performing communication from the line side to the client side according to the first embodiment. The transmission apparatus 100a includes a CPU, a memory, an auxiliary storage device, and the like which are connected to each other by a bus. The transmission apparatus 100a represents a configuration in which a signal received from the channel on the line side is transmitted to the channel on the client side. The transmission apparatus 100a includes a line signal reception unit 140, a line signal reception unit 140a, a client signal transmission unit 150, a client signal transmission unit 150a, and a main board 130a. The transmission apparatus 100 and the transmission apparatus 100a are identical apparatuses. The line signal reception unit 140 and the line signal transmission unit 120 may be identical interface cards. The line signal reception unit 140a and the line signal transmission unit 120a may be identical interface cards. The client signal transmission unit 150 and the client signal reception unit 110 may be identical interface cards. The client signal transmission unit 150a and the client signal reception unit 110a may be identical interface cards. In FIG. 2, portions different from the transmission apparatus 100 will be described.

The line signal reception unit 140 is connected to the 0-system communication channel on the line side. The line signal reception unit 140 is an interface card. The line signal reception unit 140 includes a reception unit 141, an Rx interface 142, an OH extraction unit 143, a client BRG 144, a chip interface 145, and a chip interface 146.

The reception unit 141 receives a received signal. The reception unit 141 photoelectrically converts the received signal.

The reception unit 141 transmits the photoelectrically converted signal to the Rx interface 142. The received signal is a redundant OTU4. The reception unit 141 is, for example, an interface such as QSFP28, but is not limited to such an interface.

The Rx interface 142 restores the photoelectrically converted signal to the format of the OTU4. The Rx interface 142 performs FEC decoding on the restored OTU4.

The Rx interface 142 transmits the decoded OTU4 to the OH extraction unit 143.

The OH extraction unit 143 extracts an OTU4 overhead from the OTU4. The OH extraction unit 143 transmits an in-apparatus frame from which the FEC overhead of the OTU4 is removed to the client BRG 144.

The client BRG 144 is a start end of a client redundancy section. In FIG. 2, the client redundancy section represents a redundancy section from the client BRG 144 to the client signal transmission unit 150 and the client signal transmission unit 150a. The client BRG 144 transmits identical signals to the communication channel of the active system on the client side and the communication channel of the backup system on the client side. The client BRG 144 duplicates the received O in-apparatus frame to an in-apparatus frame 1 and an in-apparatus frame 2. The client BRG 144 transmits the duplicated in-apparatus frame 1 to the chip interface 145. The client BRG 144 transmits the duplicated in-apparatus frame 2 to the chip interface 146. The client BRG 144 is one aspect of the second end.

The chip interface 145 converts the received in-apparatus frame 1 to a format transferable between chips. The chip interface 145 transmits the converted in-apparatus frame 1 to a connection unit 133a. The chip interface 146 converts the received in-apparatus frame 2 to a format transferable between chips. The chip interface 146 transmits the converted in-apparatus frame 2 to the connection unit 133a.

The line signal reception unit 140a is connected to the 1-system communication channel on the line side. The line signal reception unit 140a is an interface card. The line signal reception unit 140a includes a reception unit 141a, an Rx interface 142a, an OH extraction unit 143a, a client BRG 144a, a chip interface 145a, and a chip interface 146a. The reception unit 141a, the Rx interface 142a, and the OH extraction unit 143a perform operations similar to the reception unit 141, the Rx interface 142, and the OH extraction unit 143, and thus, the description thereof will be omitted.

The client BRG 144a is a start end of the client redundancy section. The client BRG 144a transmits identical signals to the communication channel of the active system on the client side and the communication channel of the backup system on the client side. The client BRG 144a duplicates the received in-apparatus frame to an in-apparatus frame 3 and an in-apparatus frame 4. The client BRG 144a transmits the duplicated in-apparatus frame 3 to the chip interface 145a. The client BRG 144a transmits the duplicated in-apparatus frame 4 to the chip interface 146a. The client BRG 144a is one aspect of the second end.

The chip interface 145a converts the received in-apparatus frame 3 to a format transferable between chips. The chip interface 145a transmits the converted in-apparatus frame 3 to a connection unit 134a. The chip interface 146a converts the received in-apparatus frame 4 to a format transferable between chips. The chip interface 146a transmits the converted in-apparatus frame 4 to the connection unit 134a.

The client signal transmission unit 150 is connected to the communication channel of the active system on the client side.

The client signal transmission unit 150 is an interface card. The client signal transmission unit 150 includes a chip interface 151, a chip interface 152, a line selector 153, an ODU demapping unit 154, an OH addition unit 155, a Tx interface 156, and a transmission unit 157. The client signal transmission unit 150 is an aspect of the second communication device. The second communication device communicates with a communication apparatus provided in a second network.

The chip interface 151 receives the in-apparatus frame 1 transmitted from the chip interface 145. The chip interface 151 restores the in-apparatus frame 1 converted to the format transferable between chips to a format before the conversion. The chip interface 151 transmits the restored in-apparatus frame 1 to the line selector 153. The chip interface 152 receives the in-apparatus frame 3 transmitted from the chip interface 145a. The chip interface 152 restores the in-apparatus frame 3 converted to the format transferable between chips to a format before the conversion. The chip interface 152 transmits the restored in-apparatus frame 3 to the line selector 153.

The line selector 153 is a terminal end of a line redundancy section. In FIG. 2, the line redundancy section represents a redundancy section from the line selector 153 to the line signal reception unit 140 and the line signal reception unit 140a. The line selector 153 selects one of the in-apparatus frames based on a control signal which is input by a user and indicates which of the in-apparatus frames is selected. The line selector 153 selects any one of the in-apparatus frame 1 and the in-apparatus frame 3 based on the control signal. The user may be any person as long as the user can monitor the transmission apparatus 100 or the user can access the transmission apparatus 100*a* such as an electrical carrier. Hereinafter, it is assumed that the line selector 153 selects the in-apparatus frame 1. The line selector 153 transmits the selected in-apparatus frame 1 to the OH addition unit 155. The line selector 153 is one aspect of the first end. The line selector 153 may select the in-apparatus frame based on abnormality information instead of the control signal. The abnormality information is a signal indicating an abnormality of the network. The abnormality information may be, for example, a signal indicating a disconnection of the communication channel, or may be a signal indicating a failure of the transmission apparatus. The abnormality information or the control signal may be received over a control channel connected to the transmission apparatus 100*a*. Alternatively, the abnormality information or the control signal may be acquired from the OH information extracted by the OH extraction unit 143 or the OH extraction unit 143*a*.

The ODU demapping unit 154 demaps 100GE from the in-apparatus frame 1. The ODU demapping unit 154 transmits the 100GE to the OH addition unit 155.

The OH addition unit 155 acquires the LACPDU from the redundancy controller 135*a*. The OH addition unit 155 adds the acquired LACPDU to the 100GE. The OH addition unit 155 transmits the 100GE to which the LACPDU is added to the Tx interface 156.

The Tx interface 156 converts the 100GE to a format transferable to the outside of the transmission apparatus 100*a*. The Tx interface 156 transmits the converted 100GE to the transmission unit 157.

The transmission unit 157 photoelectrically converts the input signal. The transmission unit 157 transmits the converted signal to the outside of the transmission apparatus 100*a*. The transmission unit 157 is, for example, an interface such as QSFP28, but is not limited to such an interface. An interface according to the speed of the communication channel may be used for the transmission unit 157.

The client signal transmission unit 150*a* is connected to the communication channel of the backup system on the client side. The client signal transmission unit 150*a* is an interface card. The client signal transmission unit 150*a* includes a chip interface 151*a*, a chip interface 152*a*, a line selector 153*a*, an ODU demapping unit 154*a*, an OH addition unit 155*a*, a Tx interface 156*a*, and a transmission unit 157*a*. The client signal transmission unit 150*a* is an aspect of the second communication device. The OH addition unit 155*a*, the Tx interface 156*a*, and the transmission unit 157*a* perform operations similar to the OH addition unit 155, the Tx interface 156, and the transmission unit 157, and thus, the description thereof will be omitted.

The chip interface 151*a* receives the in-apparatus frame 2 transmitted from the chip interface 146. The chip interface 151*a* restores the in-apparatus frame 2 converted to the format transferable between chips to a format before the conversion. The chip interface 151*a* transmits the restored in-apparatus frame 2 to the line selector 153*a*. The chip interface 152*a* receives the in-apparatus frame 4 transmitted from the chip interface 146*a*. The chip interface 152*a* restores the in-apparatus frame 4 converted to the format transferable between chips to a format before the conversion. The chip interface 152*a* transmits the restored in-apparatus frame 4 to the line selector 153*a*.

The line selector 153*a* is a terminal end of the line redundancy section. The line selector 153*a* selects one of the in-apparatus frames based on a control signal input from the user. The line selector 153*a* selects any one of the in-apparatus frame 2 and the in-apparatus frame 4 based on the control signal. Hereinafter, it is assumed that the line selector 153*a* selects the in-apparatus frame 2. The line selector 153*a* transmits the selected in-apparatus frame 2 to the ODU demapping unit 154. The line selector 153*a* is an aspect of the first end.

The ODU demapping unit 154*a* demaps 100GE from the in-apparatus frame 2. The ODU demapping unit 154*a* transmits the 100GE to the OH addition unit 155*a*.

The main board 130*a* includes a connection unit 131*a*, a connection unit 132*a*, the connection unit 133*a*, the connection unit 134*a*, and the redundancy controller 135*a*. The connection unit 131*a* is a network interface configured to allow an interface card to be attached and detached. The connection unit 131*a* communicatively connects the interface card connected to the connection unit 131*a* and an interface card connected to the connection unit 133*a* or the connection unit 134*a*. The connection unit 131*a* connects the client signal transmission unit 150.

The connection unit 132*a* is a network interface configured to allow an interface card to be attached and detached. The connection unit 132*a* communicatively connects the interface card connected to the connection unit 132*a* and the interface card connected to the connection unit 133*a* or the connection unit 134*a*. The connection unit 132*a* connects the client signal transmission unit 150*a*.

The connection unit 133*a* is a network interface configured to allow an interface card to be attached and detached. The connection unit 133*a* communicatively connects the interface card connected to the connection unit 133*a* and the interface card connected to the connection unit 131*a* or the connection unit 132*a*. The connection unit 133*a* connects the line signal reception unit 140.

The connection unit 134*a* is a network interface configured to allow an interface card to be attached and detached. The connection unit 134*a* communicatively connects the interface card connected to the connection unit 134*a* and the interface card connected to the connection unit 131*a* or the connection unit 132*a*. The connection unit 134*a* connects the line signal reception unit 140*a*.

Figure 3:
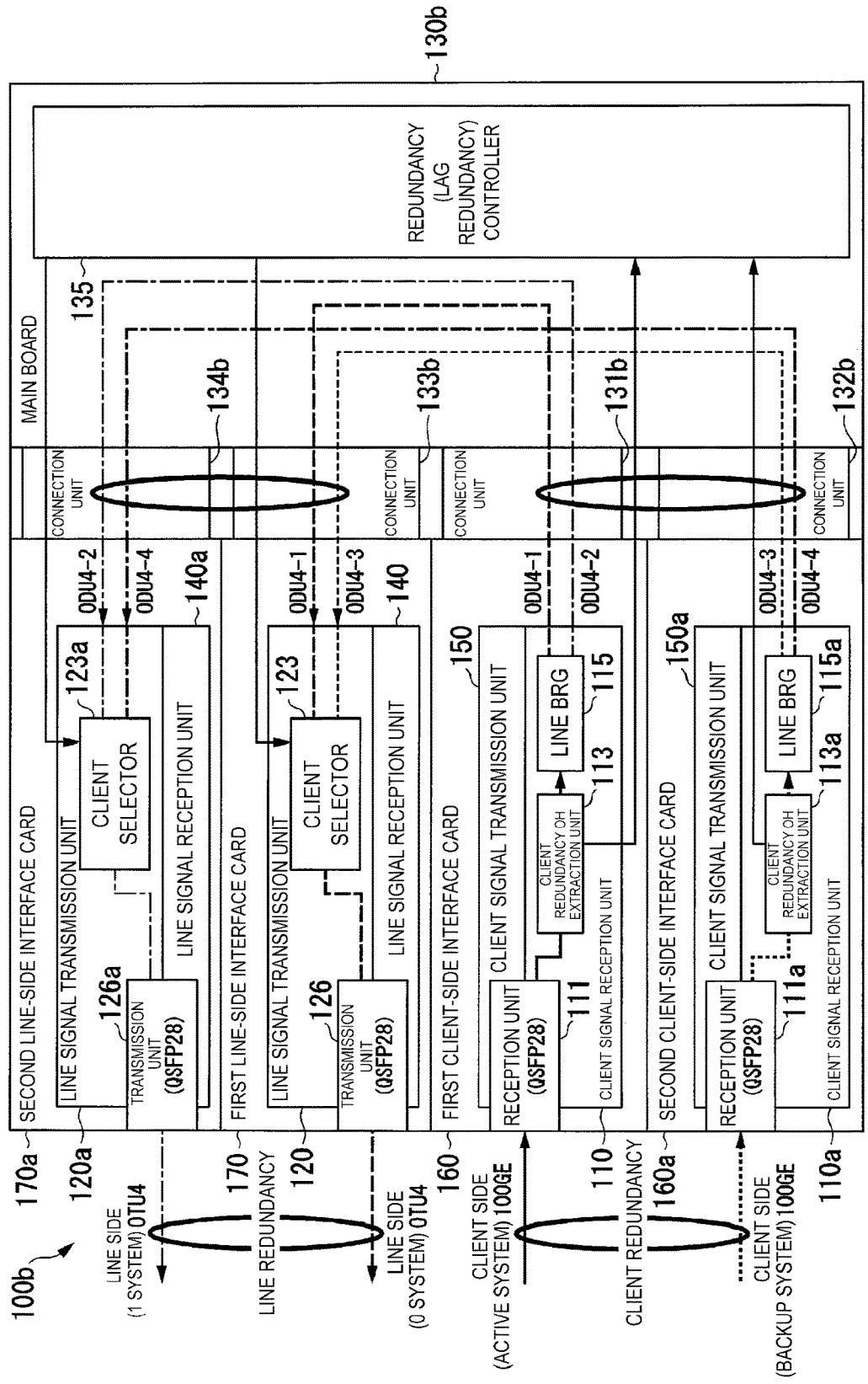
FIG. 3 is a functional block diagram of a transmission apparatus 100b for performing communication from the client side to the line side according to the first embodiment.

FIG. 3 is a functional block diagram of a transmission apparatus 100*b* for performing communication from the client side to the line side according to the first embodiment. The transmission apparatus 100*b* includes a CPU, a memory, an auxiliary storage device, and the like which are connected to each other by a bus. The transmission apparatus 100*b* represents a configuration in which a signal received from the client-side channel is transmitted to the line-side channel. The transmission apparatus 100*b* includes a main board 130*b*. The main board 130*b* includes a connection unit 131*b*, a connection unit 132*b*, a connection unit 133*b*, and a connection unit 134*b*. The connection unit 131*b* to the connection unit 134*b* are network interfaces. The transmission apparatus 100*b* enables the interface card to be pluggable to the main board 130*b* via the connection units 131*b* to 134*b*. The connection unit 131*b* to the connection unit 134*b* are configured to allow interface cards to be attached and detached. In FIG. 3, the Tx interface, the ODU mapping unit, and the chip interface are not described. Reference signs already described will be omitted.

A first client-side interface card 160 is connected to the connection unit 131*b*.

The connection unit 131b transmits a signal received by the first client-side interface card 160 to the interface cards connected to the connection unit 133b and the connection unit 134b. A second client-side interface card 160a is connected to the connection unit 132b. The connection unit 132b transmits a signal received by the second client-side interface card 160a to the interface cards connected to the connection unit 133b and the connection unit 134b.

A first line-side interface card 170 is connected to the connection unit 133b. The connection unit 133b transmits the signals transmitted from the interface cards connected to the connection unit 131b and the connection unit 132b to the first line-side interface card 170. A second line-side interface card 170a is connected to the connection unit 134b. The connection unit 134b transmits the signals transmitted from the interface cards connected to the connection unit 131b and the connection unit 132b to the second line-side interface card 170a.

The first client-side interface card 160 is an interface card including the client signal reception unit 110 and the client signal transmission unit 150. The second client-side interface card 160a is an interface card including the client signal reception unit 110a and the client signal transmission unit 150a. The first line-side interface card 170 is an interface card including the line signal transmission unit 120 and the line signal reception unit 140. The second line-side interface card 170a is an interface card including the line signal transmission unit 120a and the line signal reception unit 140a.

Figure 4:
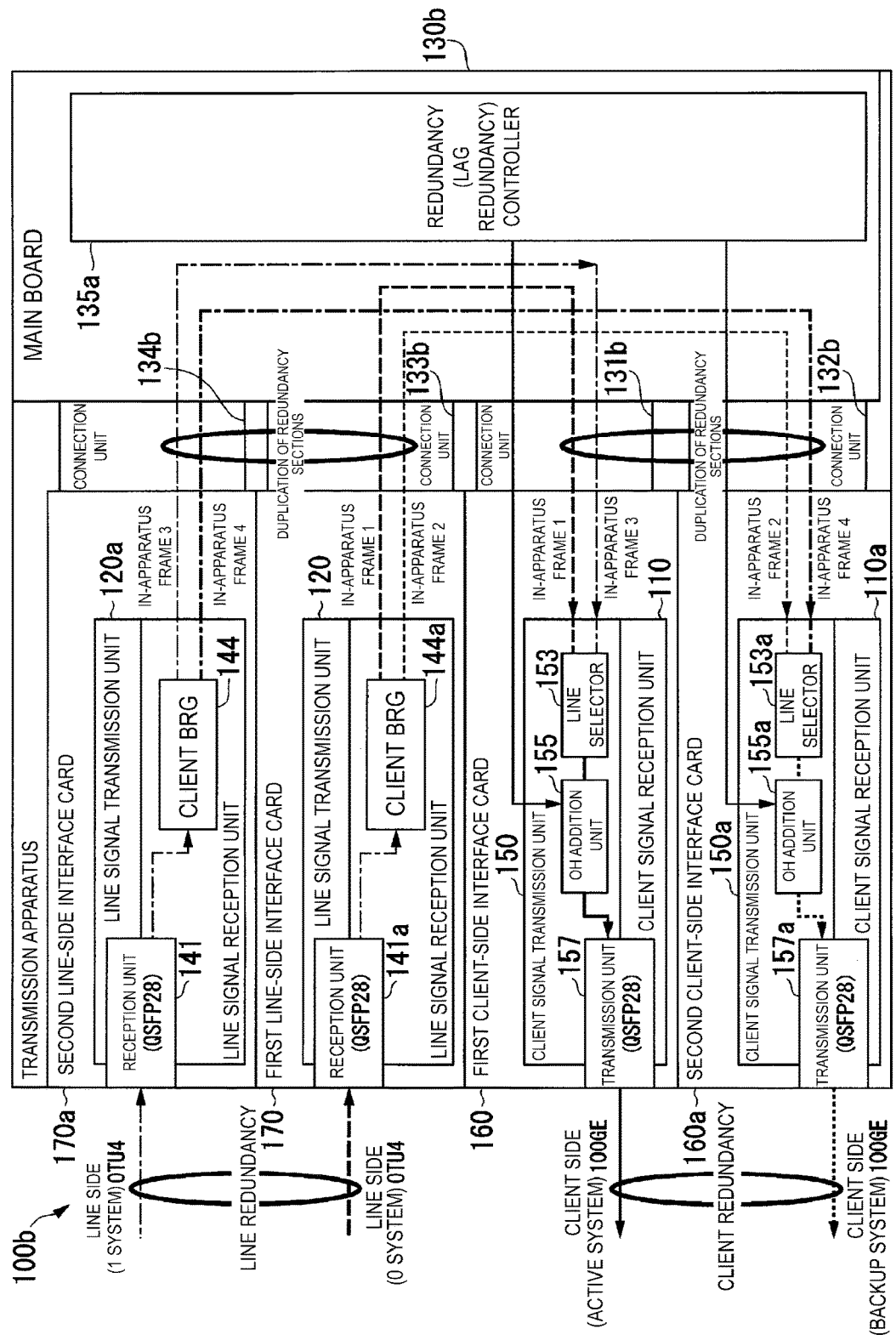
FIG. 4 is a functional block diagram of the transmission apparatus 100b for performing communication from the line side to the client side according to the first embodiment.

FIG. 4 is a functional block diagram of the transmission apparatus 100b that performs communication from the line side to the client side according to the first embodiment. The transmission apparatus 100b includes a CPU, a memory, an auxiliary storage device, and the like which are connected to each other by a bus. The transmission apparatus 100b in FIG. 4 represents a configuration in which a signal received from the channel on the line side is transmitted to the channel on the client side. In FIG. 4, the Tx interface, the ODU demapping unit, and the chip interface are not described. Reference signs already described will be omitted. Reference signs already described will be omitted.

The connection unit 133b transmits a signal received by the first line-side interface card 170 to the interface cards connected to the connection unit 131b and the connection unit 132b. The connection unit 134b transmits a signal received by the second line-side interface card 170a to the interface cards connected to the connection unit 131b and the connection unit 132b. The connection unit 131b transmits the signals transmitted from the interface cards connected to the connection unit 133b and the connection unit 134b to the first client-side interface card 160. The connection unit 132b transmits the signals transmitted from the interface cards connected to the connection unit 133b and the connection unit 134b to the second client-side interface card 160a.

In FIGS. 3 and 4, a section from the client-side interface card to the client BRG is client-redundant. In FIGS. 3 and 4, a section from the line-side interface card to the line selector are line-redundant. Thus, a section from the client BRG to the line selector is a section in which the client redundancy and the line redundancy overlap each other.

The connection unit of the transmission apparatus having the configuration illustrated in FIGS. 1 and 2 is arranged in a straight line from the line side to the client side. In contrast, in the transmission apparatus 100b having the configuration illustrated in FIGS. 3 and 4, the interface card can be pluggable to the main board 130b via the connection units 131b to 134b. With such a configuration, the transmission apparatus 100b can prevent reliability from decreasing between the main board 130b and the connection units 131b to 134b. The transmission apparatus 100b has two types of the interface card, that is, the line-side interface card and the client-side interface card, and thus the interface card can be easily exchanged at the time of a failure.

Figure 5:
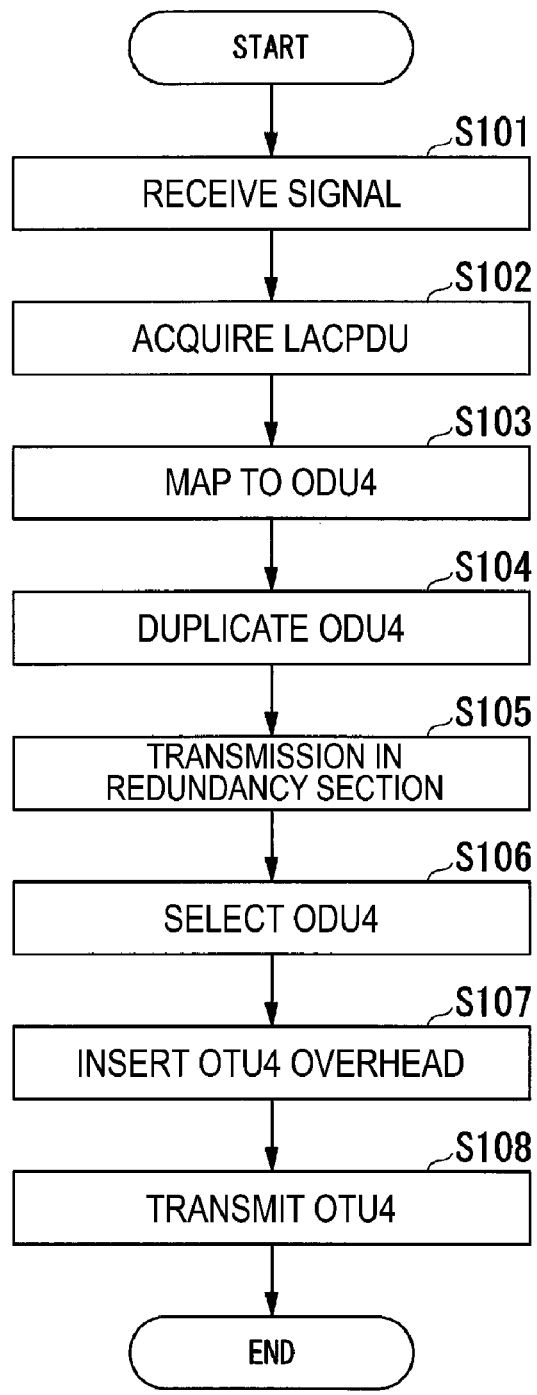
FIG. 5 is a flowchart illustrating processing of performing transmission by the transmission apparatus 100 according to the first embodiment from a client-side channel to a line-side channel.

FIG. 5 is a flowchart illustrating processing of performing transmission by the transmission apparatus 100 according to the first embodiment from the client-side channel to the line-side channel. This processing is executed when a signal is received from the client-side channel. Although the processing in the client signal reception unit 110 connected to the communication channel of the active system on the client side is described in FIG. 5, the identical processing is performed on the client signal reception unit 110a connected to the communication channel of the backup system on the client side.

The reception unit 111 of the transmission apparatus 100 receives the received signal (step S101). The client redundancy OH extraction unit 113 acquires the LACPDU from the received signal (step S102). The client redundancy OH extraction unit 113 transmits the acquired LACPDU to the redundancy controller 135. The ODU mapping unit 114 maps the received signal to the ODU4 (step S103). The line BRG 115 duplicates the ODU4 to the ODU4-1 and the ODU4-2 (step S104). The line BRG 115 transmits the ODU4-1 and the ODU4-2 to the line signal transmission unit 120 and the line signal transmission unit 120a over the redundancy section, respectively (step S105). The redundancy section is a section connected by the line BRG 115 and the client selector 123. The redundancy section is a section in which the redundancy configuration of the client signal reception unit 110 and the redundancy configuration of the line signal transmission unit 120 overlap each other.

The client selector 123 selects any one of the ODU4 received from the client signal reception unit 110 and the ODU4 received from the client signal reception unit 110a based on the control determined by the redundancy controller 135 (step S106). The OH addition unit 124 inserts the OTU4 overhead into the selected ODU4 (step S107). The transmission unit 126 transmits the OTU4 to the outside of the transmission apparatus 100 (step S108).

Figure 6:
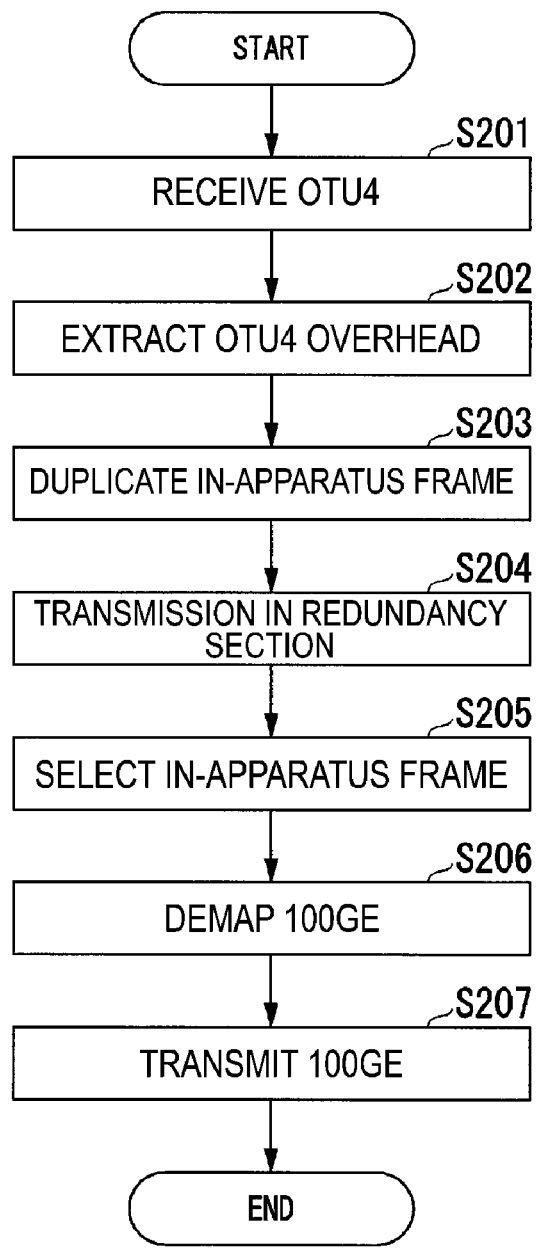
FIG. 6 is a flowchart illustrating processing of performing transmission by the transmission apparatus 100*a* according to the first embodiment from the line-side channel to the client-side channel.

FIG. 6 is a flowchart illustrating processing of performing transmission by the transmission apparatus 100a according to the first embodiment from the line-side channel to the client-side channel. This processing is executed when an OTU4 is received from the line-side channel. Although the processing in the line signal reception unit 140 connected to the 0-system channel on the line side will be described in FIG. 6, the identical processing is performed on the line signal reception unit 140a connected to the 1-system channel on the line side.

The reception unit 141 of the transmission apparatus 100 receives the OTU4 (step S201). The OH extraction unit 143 extracts the OTU overhead from the OTU4 (step S202). The client BRG 144 duplicates the in-apparatus frame to the in-apparatus frame 1 and the in-apparatus frame 2 (step S203). The client BRG 144 transmits the in-apparatus frame 1 and the in-apparatus frame 2 to the client signal transmission unit 150 and the client signal transmission unit 150a over the redundancy section, respectively (step S204). The redundancy section is a transmission section between the client BRG 144 and the line selector 153. The redundancy section is a section connected by the client BRG 144 and the line selector 153. The redundancy section is a section in which the redundancy configuration of the client signal transmission unit 150 and the redundancy configuration of the line signal reception unit 140 overlap each other.

The line selector 153 selects any one of the in-apparatus frames received from the line signal reception unit 140 and the line signal reception unit 140a based on the control signal or the abnormality information from an operator (step S205). The ODU demapping unit 154 demaps the 100GE from the selected in-apparatus frame (step S206). The transmission unit 157 transmits the converted 100GE to the outside of the transmission apparatus 100a (step S207).

In the transmission apparatus 100 having the configuration described above, the client selector 123 provided in the line signal transmission unit 120 and the client selector 123a provided in the line signal transmission unit 120a terminate the redundancy configuration of the client signal reception unit 110 and the client signal reception unit 110a. The line BRG 115 provided in the client signal reception unit 110 and the line BRG 115a provided in the client signal reception unit 110a start the redundancy configuration of the line signal transmission unit 120 and the line signal transmission unit 120a.

Thus, the client redundancy section and the line redundancy section overlap each other between the line BRG 115 and the client selector 123, and are quadruply redundant. The transmission apparatus 100 can improve the reliability of communication between the connection unit of the interface card such as the line signal reception unit and the connection unit of the interface card such as the client signal transmission unit.

With the transmission apparatus 100a having the configuration described above, the line selector 153 provided in the client signal transmission unit 150 and the line selector 153a provided in the client signal transmission unit 150a terminate the redundancy configuration of the line signal reception unit 140 and the line signal reception unit 140a. The client BRG 144 provided in the line signal reception unit 140 and the client BRG 144a provided in the line signal reception unit 140a start the redundancy configuration of the client signal transmission unit 150 and the client signal transmission unit 150a. Thus, the client redundancy section and the line redundancy section overlap each other between the client BRG 144 and the line selector 153, and are quadruply redundant. The transmission apparatus 100a can improve the reliability of communication between the connection unit of the interface card such as the line signal transmission unit and the connection unit of the interface card such as the client signal reception unit.

Since the communication between the line-side interface card and the client-side interface card is redundant, the transmission apparatus 100 or the transmission apparatus 100a having the configuration described above does not need to establish separate equipment in order to ensure the reliability between the line-side interface card and the client-side interface card. Accordingly, it is possible to improve reliability with fewer apparatus configurations. The reliability can be improved with fewer apparatus configurations, and thus use of this transmission apparatus makes it possible to establish a network at a lower cost and improve reliability.

Second Embodiment

Figure 7:
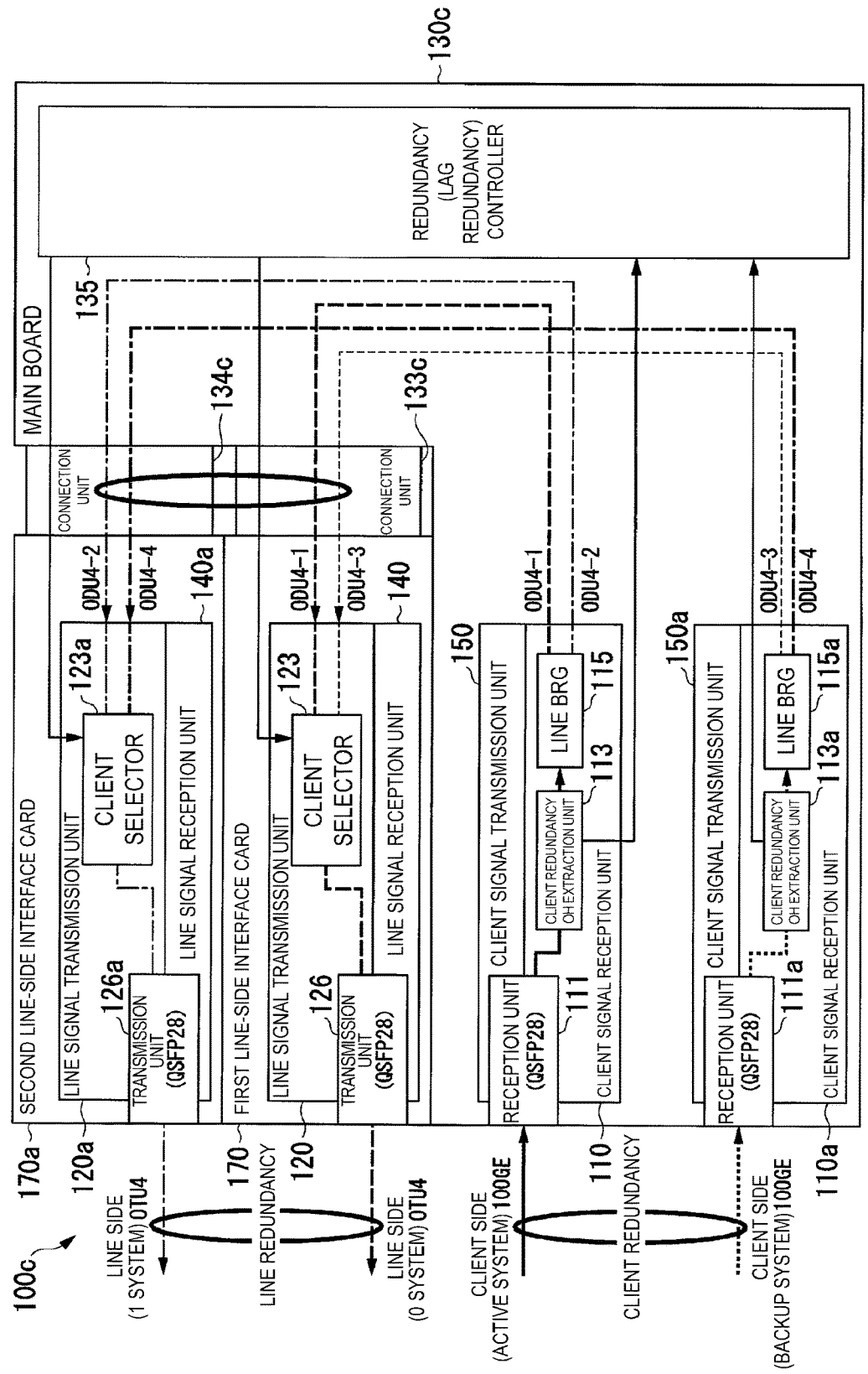
FIG. 7 is a functional block diagram of a transmission apparatus 100*c* for performing communication from a client side to a line side according to a second embodiment.
Figure 8:
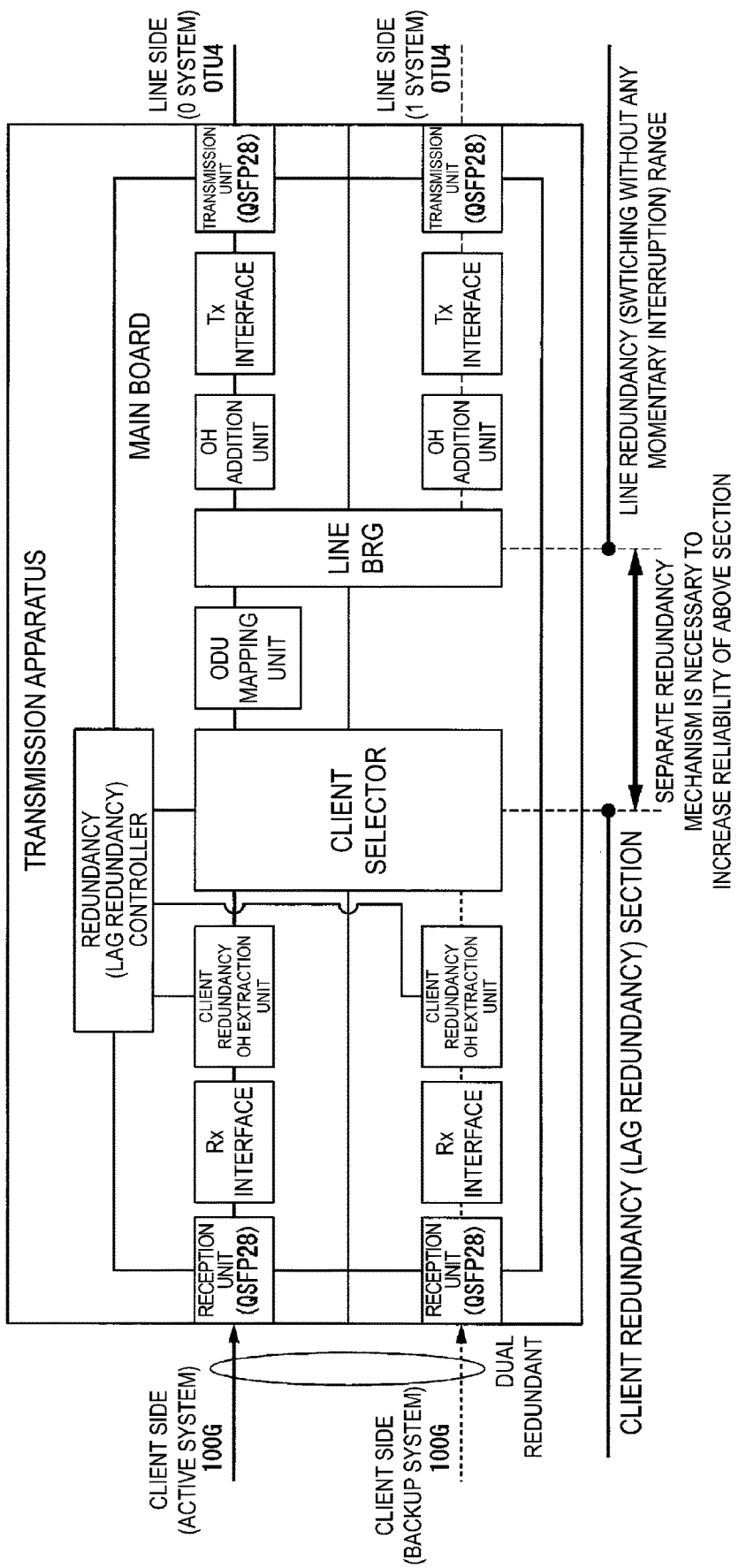
FIG. 8 is a functional block diagram of a transmission apparatus of the related art.

FIG. 7 is a functional block diagram illustrating a transmission apparatus 100c according to a second embodiment. The transmission apparatus 100c includes a CPU, a memory, an auxiliary storage device, and the like which are connected to each other by a bus. The transmission apparatus 100c represents a configuration in which a signal received from the client-side channel is transmitted to the line-side channel. The transmission apparatus 100c includes a main board 130c. The transmission apparatus 100c has a configuration in which the client signal reception unit 110, the client signal reception unit 110a, the client signal transmission unit 150, and the client signal transmission unit 150a according to the first embodiment are provided on the main board 130c. In FIG. 7, the Tx interface, the ODU mapping unit, and the chip interface are not described. Reference signs already described will be omitted.

The main board 130c includes a connection unit 133c, a connection unit 134c, a redundancy controller 135, a client signal reception unit 110, a client signal reception unit 110a, a client signal transmission unit 150, and a client signal transmission unit 150a. The connection unit 133c and the connection unit 134c are network interfaces. The connection unit 133c and the connection unit 134c are configured to allow interface cards to be attached and detached. In FIG. 7, the connection unit 133c is connected to the first line-side interface card 170. In FIG. 7, the connection unit 134c is connected to the second line-side interface card 170a.

The transmission apparatus 100c having the configuration described above includes the client signal transmission unit 150 and the client signal transmission unit 150a on the main board 130c. Thus, it is possible to enable the line-side interface card to be pluggable. Thus, one type of line-side interface card can be used as the type of the interface card in the transmission apparatus 100c, and the line-side interface card can be easily replaced even though it fails. A person who maintains or inspects the transmission apparatus 100c can more simply maintain the transmission apparatus 100c.

Although it has been described in the aforementioned embodiment that the communication channel on the client side uses the signal of the 100GE, a synchronous digital hierarchy (SDH) signal of the 10GE may be used. In this case, automatic protection switching (APS) may be used as the overhead of the client redundancy.

Although the transmission apparatus including the two client-side interface cards and the two line-side interface cards which are attachable and detachable has been described in the aforementioned embodiment, the numbers of the client-side interface cards and the line-side interface cards are not limited to two. For example, the transmission apparatus may be a transmission apparatus to which N client-side interface cards and M line-side interface cards can be attached and detached. N is a natural number of 2 or more. M is a natural number of 2 or more.

In the present embodiment, the transmission apparatus may be implemented by using a plurality of information processing apparatuses communicatively connected via a network. The functional units included in the transmission apparatus may be distributed and mounted in the plurality of information processing apparatuses. For example, the redundancy controller 135 may be mounted in different information processing apparatuses.

The transmission apparatus in the above-described embodiments may be achieved by a computer. In such a case, the transmission apparatus may be achieved by recording a program for implementing these functions in a computer-readable recording medium, causing a computer system to read the program recorded in the recording medium, and executing the program. The "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication channel used when a program is transmitted via a network such as the Internet and a communication line such as a telephone line, and may also include such a medium that stores programs for a certain period of time, one example of which is volatile memory inside a computer system that functions as a server or a client in the above-described case. Furthermore, the above program may be a program for implementing a part of the above-mentioned functions. The above program may be a program capable of implementing the above-mentioned functions in combination with another program already recorded in a computer system. The above program may be a program to be implemented with the use of a programmable logic apparatus such as a field programmable gate array (FPGA).

The embodiments of the present disclosure have been described above in detail with reference to the drawings. However, specific configurations are not limited to those embodiments, and include any design or the like within the scope not departing from the gist of the present disclosure.

REFERENCE SIGNS LIST

100 Transmission apparatus
110 Client signal reception unit
111 Reception unit
112 Rx interface
113 Client redundancy OH extraction unit
114 ODU mapping unit
115 Line BRG
116 Chip interface
117 Chip interface
120 Line signal transmission unit
121 Chip interface
122 Chip interface
123 Client selector
124 OH addition unit
125 Tx interface
126 Transmission unit
130 Main board
131 Connection unit
132 Connection unit
133 Connection unit
134 Connection unit
135 Redundancy controller
140 Line signal reception unit
141 Reception unit
142 Rx interface
143 OH extraction unit
144 Client BRG
145 Chip interface
146 Chip interface
150 Client signal transmission unit
151 Chip interface
152 Chip interface
153 Line selector
154 ODU demapping unit
155 OH addition unit
156 Tx interface
157 Transmission unit

The invention claimed is:

1. A transmission apparatus comprising:
    redundant first communication devices configured to communicate with a communication apparatus provided in a first network; and
    redundant second communication devices configured to communicate with a communication apparatus provided in a second network, wherein
    the second communication devices include respective first ends that are ends of redundant communication paths of the first communication devices,
    the first communication devices include respective second ends that are ends of redundant communication paths of the second communication devices,
    the first ends are configured to transmit received signals received by the second communication devices to the first communication devices,
    each of the second ends is configured to select any one of the received signals transmitted from the second communication devices,
    the transmission apparatus further comprises a redundancy information extractor configured to acquire redundancy information indicating a redundant state of the second communication devices from the second communication devices, and a redundancy controller configured to control one of the received signals selected by each of the second ends based on the redundancy information, wherein
        the redundancy controller is provided on a main board while each of the first communication devices and the second communication devices is attachably and detachably connected to the main board.

2. The transmission apparatus according to claim 1, wherein
    the second ends are configured to transmit received signals received by the first communication devices to the second communication devices, and
    each of the first ends is configured to select any one of the received signals transmitted from the first communication devices.

3. The transmission apparatus according to claim 2, wherein
    each of the first ends is configured to select any one of the received signals based on abnormality information indicating an abnormality of the network or a control signal for controlling which of the received signals is selected, the control signal being input by a user.

4. The transmission apparatus according to claim 1, wherein
    one or more of the first communication devices or the second communication devices are interface cards.

5. A transmission method performed by a transmission apparatus which comprises: redundant first communication devices configured to communicate with a communication apparatus provided in a first network; and redundant second communication devices configured to communicate with a communication apparatus provided in a second network, wherein the second communication devices include respective first ends that are ends of redundant communication paths of the first communication devices, the first communication devices include respective second ends that are ends of redundant communication paths of the second communication devices, the transmission method comprising:
    providing a redundancy controller on a main board and providing each of the first communication devices and second communication devices to be attachably and detachably connected to the main board;
    transmitting, by the first ends, received signals received by the second communication devices to the first communication devices;

selecting, by each of the second ends, any one of the received signals transmitted from the second communication devices;

acquiring, by the redundancy controller, redundancy information indicating a redundant state of the second communication devices from the second communication devices; and controlling, by the redundancy controller, one of the received signals selected by each of the second ends based on the redundancy information.

6. The transmission method according to claim 5, wherein
the second ends are configured to transmit received signals received by the first communication devices to the second communication devices, and each of the first ends is configured to select any one of the received signals transmitted from the first communication devices.

7. The transmission method according to claim 6, wherein
each of the first ends is configured to select any one of the received signals based on abnormality information indicating an abnormality of the network or a control signal for controlling which of the received signals is selected, the control signal being input by a user.

8. The transmission method according to claim 5, wherein one or more of the first communication devices or the second communication devices are interface cards.

\* \* \* \* \*